May 2, 1967 D. H. ALDEBORGH ETAL 3,316,650
DIAL BORE GAGE WITH RETRACTION MEANS
Filed March 8, 1965 5 Sheets-Sheet 1
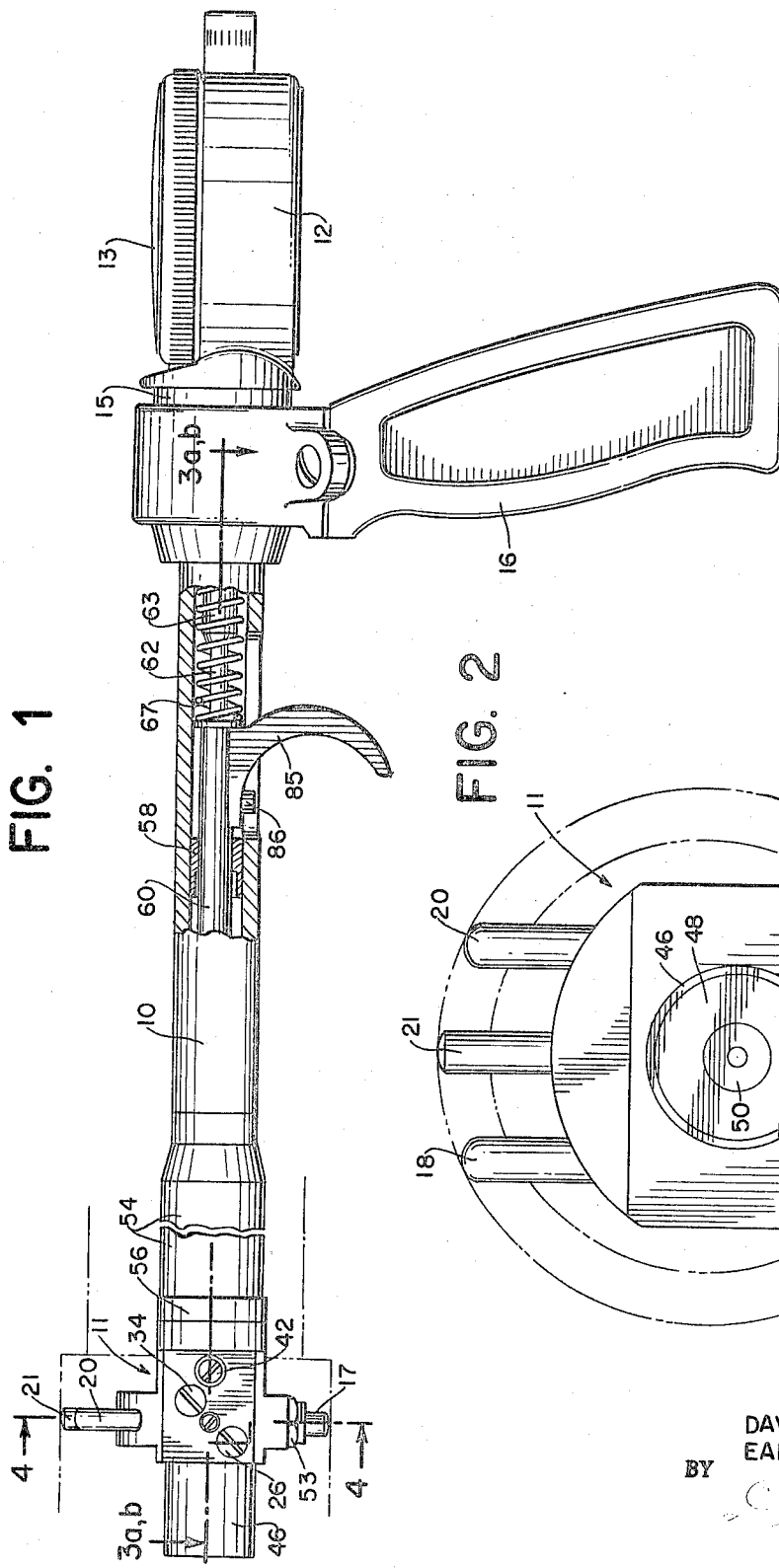
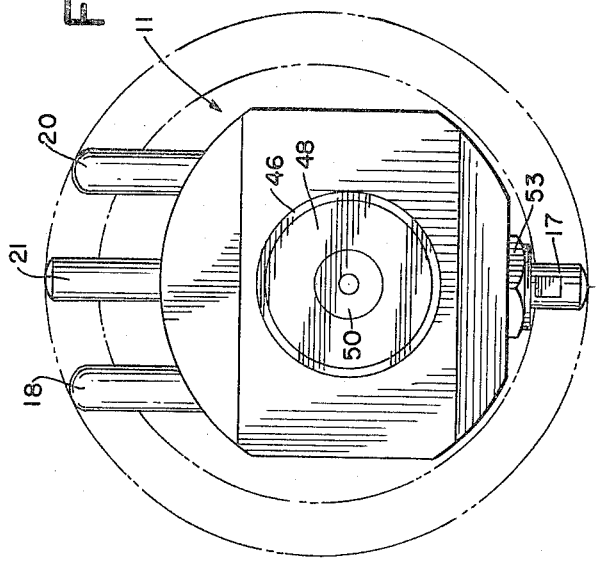
INVENTORS
DAVID H. ALDEBORGH
EARL M. BOAT
BY
ATTORNEYS

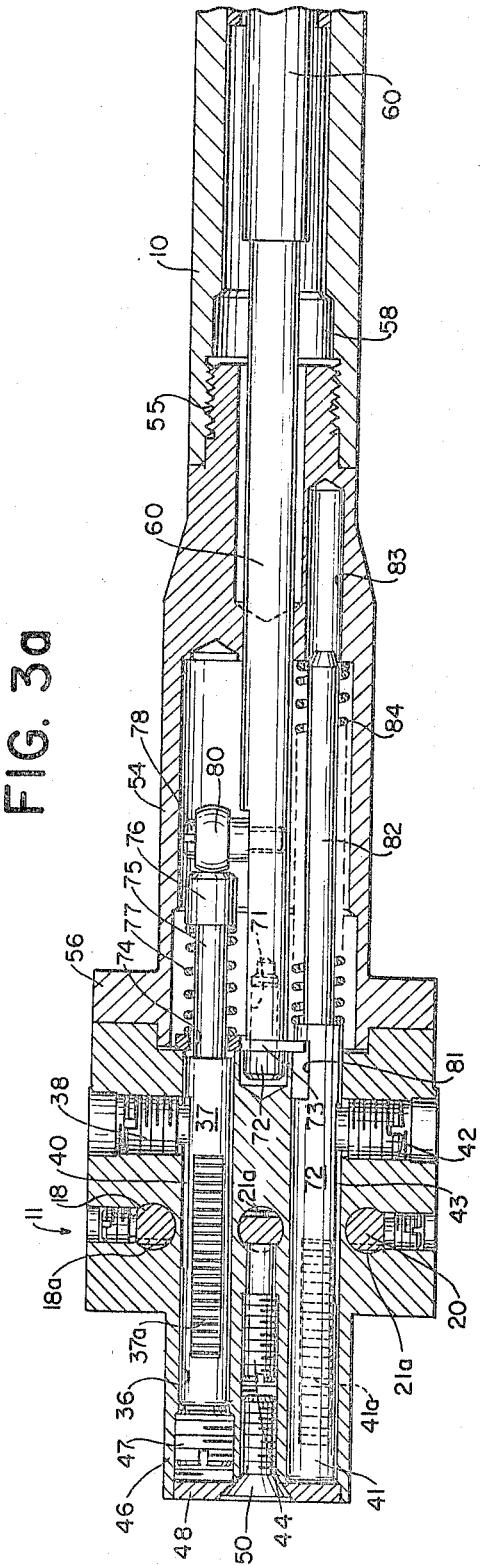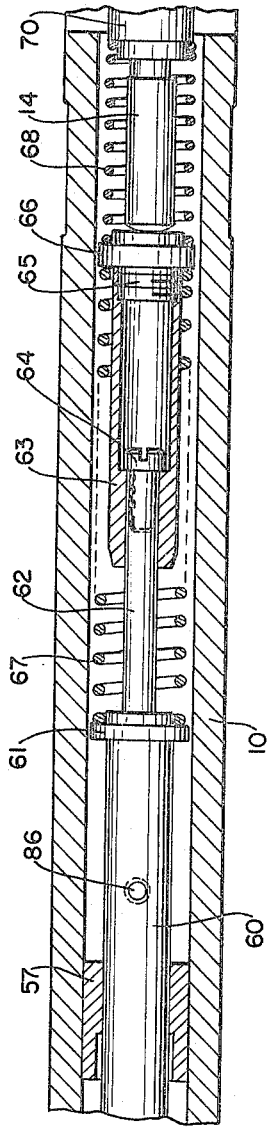

May 2, 1967 D. H. ALDEBORGH ETAL 3,316,650
DIAL BORE GAGE WITH RETRACTION MEANS
Filed March 8, 1965 5 Sheets-Sheet 3

INVENTORS
DAVID H. ALDEBORGH
EARL M. BOAT
BY
*Darby & Darby*
ATTORNEYS

May 2, 1967

D. H. ALDEBORGH ETAL 3,316,650

DIAL BORE GAGE WITH RETRACTION MEANS

Filed March 8, 1965

INVENTORS
DAVID H. ALDEBORGH
EARL M. BOAT

BY

ATTORNEYS

3,316,650
DIAL BORE GAGE WITH RETRACTION MEANS

David H. Aldeborgh and Earl M. Boat, Poughkeepsie, N.Y., assignors to Standard Gage Company, Inc., Poughkeepsie, N.Y., a corporation of New York
Filed Mar. 8, 1965, Ser. No. 437,720
19 Claims. (Cl. 33—178)

The present invention relates to dial bore gages and particularly to such gages which are provided with means for retracting the centralizing and gaging plungers in order that the gage head may be entered into a bore with the gaging plungers out of contact with the bore until the gaging point is reached.

The retraction of the plungers is desirable for a number of reasons; such retraction avoids marking a bore by the drag of spring loaded contacts upon the bore wall; it enables the gage head to pass a hole or other interruption in the bore wall without the danger that one of the plungers may be caught in such hole and the gage damaged, and it permits the gaging of a larger diameter bore located beyond a smaller entry bore.

In order that a dial bore gage be truly useful in gaging a larger diameter bore which must be entered by passing the gaging head through a smaller diameter bore, it is desirable that a considerable amount of retraction movement be possible. In the past the gages which were capable of such relatively large retraction movement were of the non-centralizing type, i.e., with a fixed and a single movable gaging member and with no centralizing plungers or, in some instances, with two fixed centralizing contacts opposing the gaging contact. Neither of these types provides a true centralizing action and they were therefore generally unsatisfactory.

Another form of retracting dial bore gage which gives sufficient range of retraction for the purposes discussed above, was one in which three contact points are utilized equally spaced about the circumference of a circle and all serving as gaging contacts. This type of gage again is not truly a centralizing gage because in order to ascertain the minimum the operator must oscillate the gage in two planes in order to be assured that its axis coincides with the bore axis or, in other words, to assure that the gaging contacts lie on points in a plane at right angles to the bore axis. As will be apprericated, this movement in two planes is relatively difficult to accomplish and it is thus difficult for even an experienced gage operator to make a highly accurate measurement. Also since the limited amount of centralizing is accomplished by spring pressure on the gaging plungers it is not possible to have relatively high pressure for centralizing without having the pressure for gaging undesirable high.

Additionally, the range of the instrument is modified by replacing the three gaging contact tips with others of different length in order to approximate the bore size. This imposes an incremental change which limits the useful retraction since the diameter to be measured is frequently considerably less than the diameter of the fully extended contacts.

The present invention provides a much greater degree of retraction without imposing limits to this retraction as just described.

In our invention a dial bore gage of the type which utilizes a fixed gaging contact together with a pair of movable centralizing contacts and a movable gaging contact is provided, all three plungers, i.e., the centralizing plungers and gaging plunger being retractable through the medium of the same motion transmitting rod which operates the indicator. This is accomplished through the use of racks and pinions for operating both the gaging and centralizing contacts in such a manner that the action of the centralizing plungers, when gaging a bore, is independent of the gaging motion transfer, the arrangement of the racks and pinions making it possible for the gaging plunger to move further outward to contact the bore when the retraction trigger is released.

Additionally, the arrangement of the parts is such that a spring which opposes the retracting movement and which likewise urges the centralizing plungers outwardly does not have any effect upon the gaging plunger which therefore permits lighter spring pressure on the gaging system, smoother action, and concomitant lesser wear on the gear teeth and bearings of the gaging system.

Since in general the dial indicator utilized will have a maximum range considerably less than the total range of retraction, there is provided an overrunning sleeve which seats firmly on a shoulder while gaging but which permits the plunger to be retracted a much greater distance than the total range of the indicator used. For example, in a particular dial bore gage the indicator unit has a maximum range of approximately $3/32$ inch, but the retraction trigger, and of course the extension plunger which transmits movement to the dial indicator, may move approximately $7/16$ inch further.

It is of course possible to utilize a dial indicator having a range greater than the retracting length in which event the overrunning sleeve arrangement could be eliminated. This would have the advantage of permitting use of the dial bore gage for checking several diameters within the total retracting range without resetting of the adjustable extension contact. However, dial indicators having shorter range are generally more accurate and are thus usually to be preferred and therefore the overrunning sleeve arrangement is desirable.

The dial bore gage of the present invention is, in a modified form, also useful for checking the concentricity of two or more bores, this being particularly the case when the concentricity of a larger bore with respect to a smaller bore through which the larger bore must be entered is to be checked. When utilized as a concentricity gage the centralizing plungers and associated racks and pinions are not provided and a sleeve or plug is provided which centralizes the gage stem in the reference bore and permits determination of concentricity by rotating the gage while in position in the reference bore.

It is an object of the invention to provide a dial bore gage of the type having a fixed and a movable gaging plunger and two movable centralizing plungers, one located on either side of the movable gaging plunger and in which all three movable plungers are retractable over a relatively great distance.

It is another object of the invention to provide such a gage in which the transfer of movement from the gaging plunger to the dial indicator is effected through the use of racks and gears thus making it possible to secure the large amount of retraction desired within a relatively small head, which would be difficult if not impossible with other means of motion transfer.

It is a further object of the invention to provide such a retracting dial bore gage with means whereby the spring loading of the centralizing plungers is not transferred to the gaging plunger while in gaging position, thereby assuring that the gaging movement will be under light spring pressure and will thus be accomplished with smoother action and less wear of the rack and gear teeth and on the bearings.

It is a further object of the invention to provide a dial bore gage having a gaging plunger with a large retraction movement and an adjustably limited outward movement together with a centralizing sleeve or plug which is adapted to determine the concentricity of two bores.

Other objects and features of the invention will be apparent when the following description is considered in connection with the annexed drawings, in which, FIGURE 1 is a side elevational view of the dial bore gage of our invention showing a portion of the housing broken away in order to illustrate the form of the retracting trigger. This view also shows in dash-dot lines a bore in which the gage has been inserted in gaging position and a second bore through which the gage head has passed to arrive at the gaging position in the first mentioned bore;

FIGURE 2 is an enlarged front elevational view of the gage of FIGURE 1;

FIGURES 3a and 3b, taken together, constitute a longitudinal horizontal section of the gage of our invention, the view being taken on the plane of the lines 3a, b–3a, b of FIGURE 1;

Figure 7:
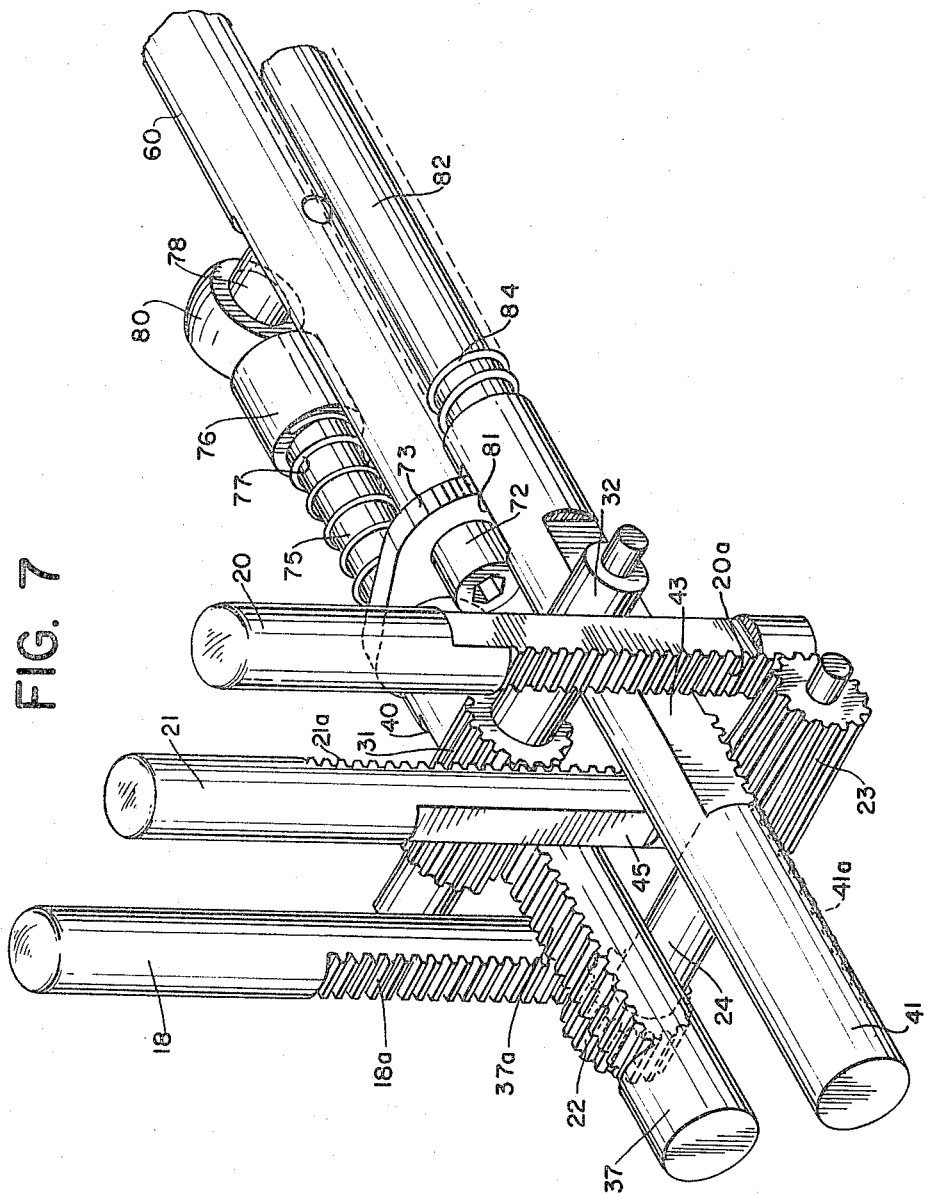
FIGURE 7 is an isometric view showing the arrangement of the extension plunger driving racks, driving pinions and centralizing and measuring plungers.
Figure 8:
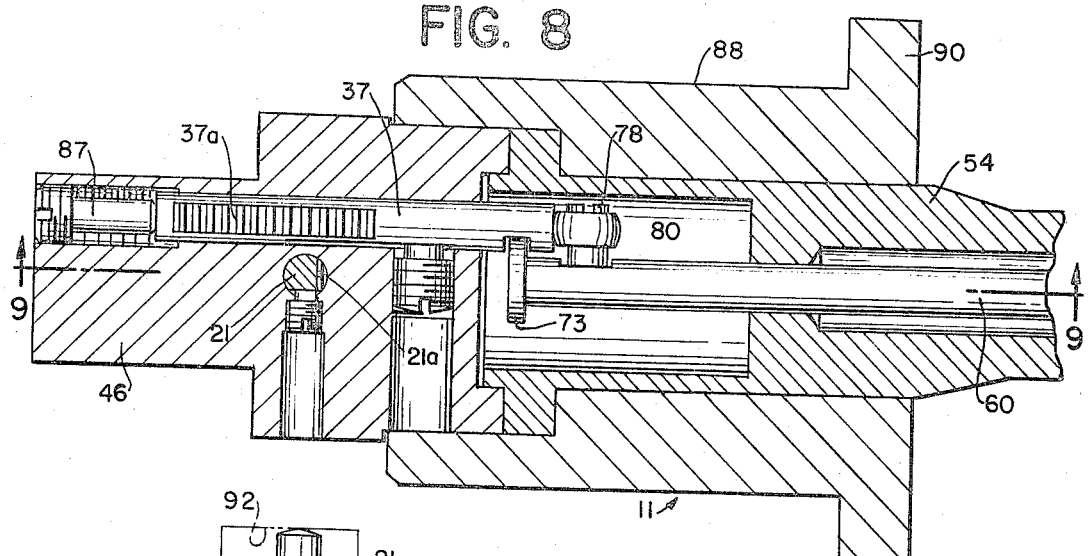
Figure 9:
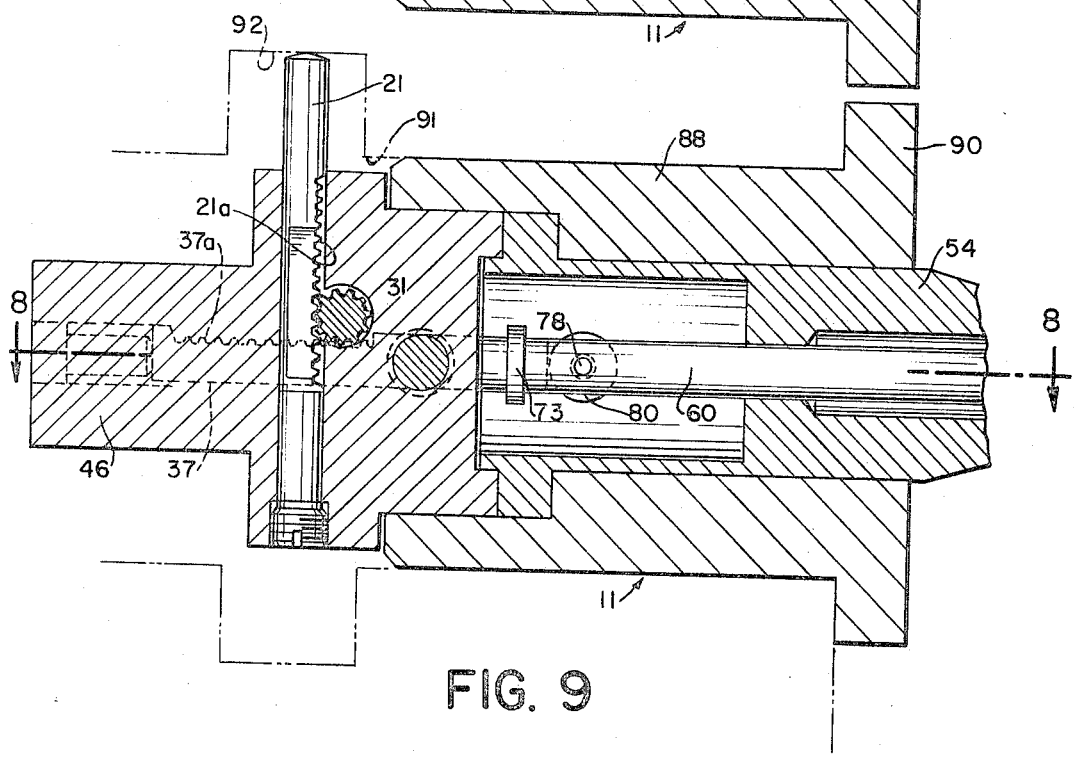

FIGURE 8 is a transverse cross-sectional view taken on the plane of the line 8—8 of FIGURE 9 and showing the modifications of the gage of FIGURES 1 through 7 to adapt it for use as a concentricity gage; and FIGURE 9 is a cross-sectional view taken on the plane of the line 9—9 of FIGURE 8 further illustrating the concentricity gage embodiment of the invention.

Referring now to the drawings and particularly to FIGURE 1, the dial bore gage of our invention comprises a barrel 10 having a gaging head generally designated 11 fixed thereto at the outer end thereof. A dial indicator housing 12 is fixed to the barrel at the opposite end thereof and the dial indicator 13 is mounted in this housing with its contact plunger 14, FIGURE 3b, extending into the barrel 10. Clamped to a cylindrical portion 15 of the housing 12 is a pistol grip 16 by means of which the instrument is handled.

As is common in the art, a fixed gaging contact 17 is mounted in the gaging head 11 as shown in FIGURE 2. This contact, although mentioned as fixed, is adjustable to provide for gaging of a range of bore diameters and is replaceable by longer extensions to increase that range.

Likewise mounted in the gaging head 11 are the two centralizing plungers 18 and 20 and the movable gaging plunger 21. As is clearly seen in FIGURES 4, 5 and 6, these plungers are reciprocably mounted in bores in the gaging head 11 and are provided with rack teeth respectively designated 18a, 20a and 21a.

The rack teeth of centralizing plungers 18 and 20 engage pinions 22 and 23 respectively, these pinions being integral with each other and, in fact, formed by machining a splined shaft to form the two gear sections or pinions. The ends of the pinion shaft 24 are of a reduced diameter and are journalled in bearings 25 which are carried in screw threaded plugs 26 which are in turn threaded into the ends of a bore 27 extending through the head 11 as is clearly seen in FIGURE 4. As is clearly seen in FIGURE 6, the bore 27 is of a diameter such that the pinions can be inserted therethrough and then supported in the bearings 25 as the plugs 26 are threaded into the enlarged and threaded ends of the bore 27. Also, as clearly seen in FIGURE 6, the plugs 26 after being properly positioned, are held in place by means of rods 28, preferably of nylon, held by setscrews 30.

Gaging plunger 21 is similarly mounted for reciprocation in the gaging head 11 and, as stated, is provided with the rack teeth 21a. These teeth mesh with a pinion 31 integral with shaft 32 which is supported in a transverse bore 33 in the gaging head in a manner similar to that in which the pinion shaft 24 is supported, that is, plugs 34 which contain bearings are threaded into enlarged end portions of the bore 33 and support the shaft 32 for rotation. As is the case with the plugs 26, plugs 34 are held in adjusted position by means of the set screws 35.

Figure 4:
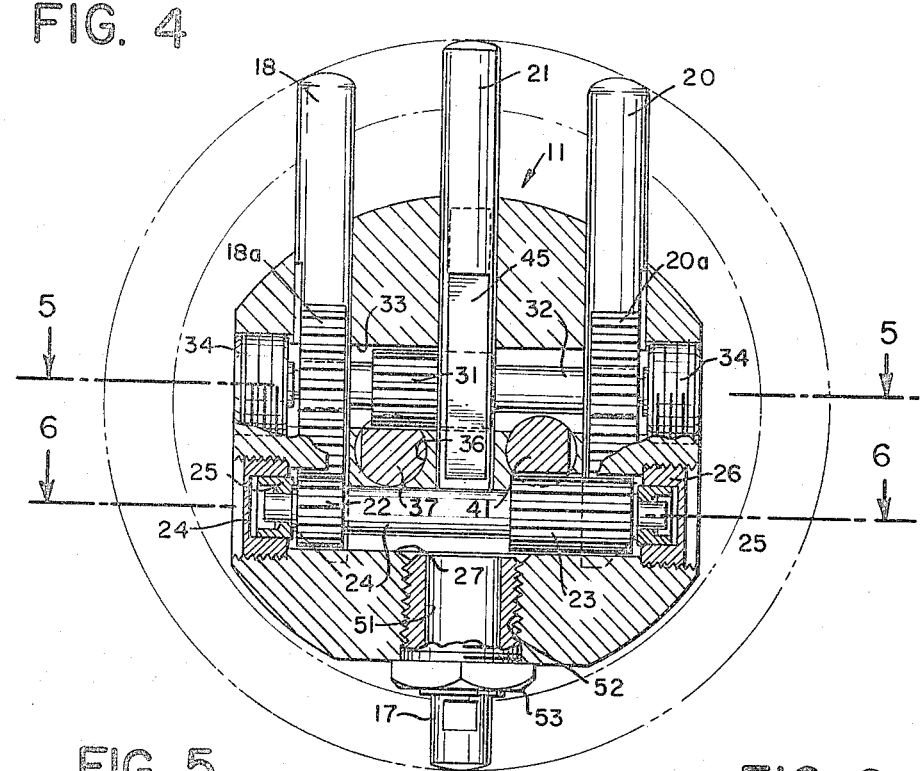
FIGURE 4 is a vertical cross-sectional view of the gaging head at an enlarged scale, the view being taken on the planes of the line 4—4 of FIGURE 1.
Figure 5:
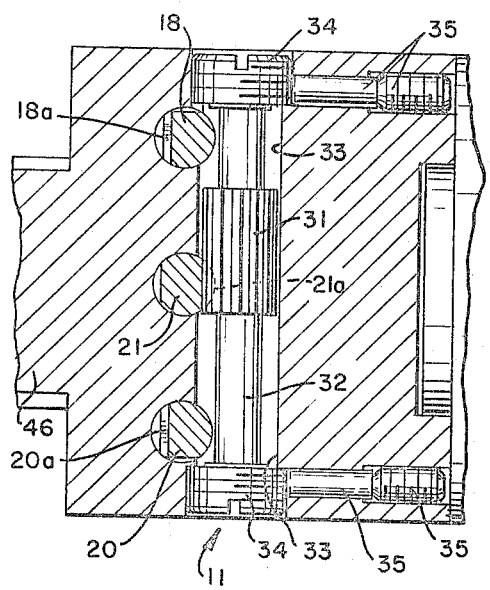
FIGURE 5 is a horizontal sectional view taken on the plane of the line 5—5 of FIGURE 4 and showing particularly the arrangement of the driving pinion for the measuring plunger together with the mode of mounting the pinion shaft in the gaging head.
Figure 6:
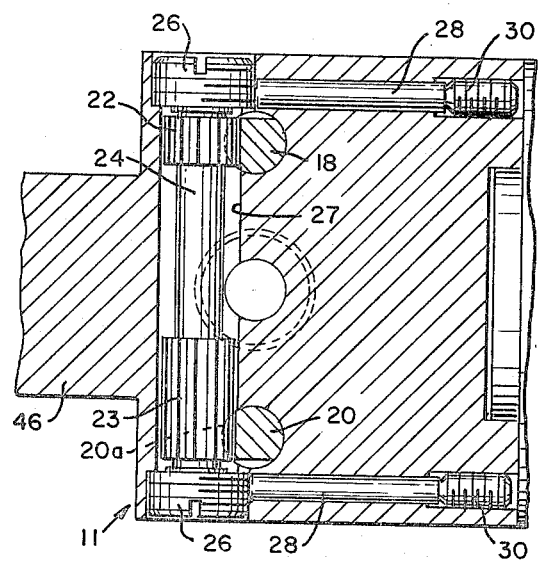
FIGURE 6 is a view similar to FIGURE 5, taken on the plane of the line 6—6 of FIGURE 4, and showing the driving pinion mounting and arrangement for driving the centralizing plungers.

Mounted in a bore 36, FIGURES 3a, 4 and 7, in the gaging head 11, is a first rack plunger 37, the teeth 37a of which mesh with the teeth of pinion 31 which also engages the teeth 21a of the gaging plunger 21. The rotation of rack 37 is prevented by guide screw 38 which bears against the flattened portion 40 of the plunger, the flat being of such length and position that it can limit the retracting movement but not the outward movement of the measuring plunger which is effected by a stop screw 47 at the front end of the bore 36.

In a similar manner a second rack 41 is mounted in another bore in gaging head 11 extending parallel to the longitudinal axis of the barrel 10 and gaging head 11, this rack being provided with the rack teeth 41a on its lower surface. The movement of rack 41 is similarly guided by means of the screw 42 which bears against the flatted portion 43. It should be noted that the length of the flatted area 43 of rack 41 is greater than the length of the flatted portion 40 of rack 37 to permit the greater required movement of the centralizing plungers 18 and 20.

The measuring plunger 21 is guided in its travel by means of a screw 44 which bears against a flatted portion 45 of the gaging plunger. For convenience the screw 44 is made relatively short and is threaded into a longitudinally extending bore in the head 11 to a considerable depth.

As is clearly seen in FIGURES 2 and 3a the head 11 includes a cylindrical extension 46 into which the bores for the racks 37 and 41 extend. The open end of bore 36 is enlarged and receives a screw 47 which serves as a limiting stop for outward movement of the first rack 37 and consequently of the entire measuring and centralizing mechanism. The end of the cylindrical extension 46 is covered by a cover plate 48 which is held in position by means of a screw 50 threaded into the same threaded opening which accommodates the gaging plunger guide screw 44.

Before proceeding further with the description of this device it should be pointed out that by placing the two racks 37 and 41 in the same horizontal plane, the vertical dimension of the gaging head is kept small and likewise by utilizing flatted portions of the two racks as the toothed portions and by interrupting the pinions and fitting the centralizing and gaging plungers therebetween, the centralizing and gaging plungers are maintained in the same plane, as is essential, while providing a degree of retraction which has heretofore been unobtainable. It should be noted additionally that the arrangement is such that the gaging plunger 21 is provided with teeth at the rear or right hand thereof as seen in FIGURE 3a while the centralizing plungers 18 and 20 are provided with rack teeth on the forward or left hand side as seen in that figure, thus achieving the required positioning of the centralizing and gaging plungers in the same plane and also keeping the major portion of the rack teeth within the head.

The size of the head 11 is maintained small also since the centralizing plungers are mounted in bores which extend entirely through the head permitting the lower ends of the centralizing plungers to protrude when fully retracted, the protrusion being limited, however, so that these plungers can never make contact with the opposite wall of the bore. Likewise contributing to the small size of the head is the arrangement of the fixed gaging contact 17 which, as is seen in FIGURE 4, is formed with a cavity 51 into which the lower end of the gaging plunger 21 moves when fully retracted. The teeth 21a of gaging plunger 21 are within the head at all times, which is desirable for maintaining accuracy.

The fixed gaging contact is, as has been heretofore indicated, in fact adjustable, being provided with screw threads which are threaded into a bore 52 in the head 11 in the usual manner, the fixed contact then being locked in the adjusted position by means of the lock nut 53.

Returning now to the description of the construction of the dial bore gage, it will be seen in FIGURE 3a that the head 11 is joined to the barrel 10 by means of a cylindrical portion 54, the outer diameter of which is greater at its left hand end than at its right hand end. The right hand end is screw-threadedly fixed by means of the threaded reduced portion 55 to an internal screw thread on the barrel 10 and the left hand end of the cylindrical portion 54 is provided with a flange 56 which is fixed to the head or block 11 by any suitable means.

Mounted in suitable bearings 57 and 58 (FIGS. 3a and 3b) in the barrel 10 and cylindrical portion 54 respectively is an extension rod 60 which, in cooperation with other means, transmits movement from the gaging plunger 21 to the indicator plunger 14. Rod 60 is fitted with a collar 61 at its right hand end and has a reduced diameter extension 62 at that end.

A sleeve 63 is slidably mounted on the extension 62 and a screw 64 threaded into the end of the extension 62 limits the movement of the sleeve toward the right as seen in FIGURE 3b. The sleeve 63 is provided with a plug 65 which is screwed into its right hand end, this plug having a collar or flange 66 thereon. A spring 67 extends between the collars 61 and 66 and thus normally maintains the sleeve 63 in the extended position shown in FIGURE 3b.

In FIGS. 3a and 3b the internal portions of the gage are shown in a position with plungers 18, 20 and 21 fully extended. As will be obvious, however, under certain circumstances, such as where a limited range indicator movement is used, it is desired to permit further retraction of gaging plunger 21 without moving the indicator plunger 14. This is accomplished by the lost motion connection provided by the spring 67 which may be compressed and the rod extension 62 of 60 thus moved to the right within the sleeve 63 even though the dial indicator plunger 14 has reached its instop position. In order to slightly augment the spring pressure exerted by the gaging plunger 21 during its movement into gaging position, a spring 68 is provided which extends between the housing 70 of the indicator contact plunger 14 and the collar 66.

At its left hand end as seen particularly in FIGURE 3a, the rod 60 is provided with a threaded bore 71. A screw 72 threaded into the bore 71 holds an operating arm 73 in position on the plunger 60. Operating arm 73 extends horizontally and is provided at its upper end as seen in FIGURE 3a with a clearance hole 74 through which an extension 75 of the rack 37 extends. Fixed to the end of extension 75 is a cap 76 and extending between the flange of cap 76 and arm 73 is a compression spring 77.

Fixed to the rod 60 in any suitable manner as by means of screw threads is a pin 78 having a rounded enlargement 80 thereon. Thus the rack 37 is held in a position in which the right hand end of the cap 76 bears against the enlargement 80 due to the pressure exerted by the spring 77.

The operating arm 73 also extends in the opposite direction, that is, toward the rack 41 and in fact extends into a notch 81 formed therein. The rack 41 is provided with a cylindrical extension 82 guided in a bore 83 formed in the cylindrical housing portion 54 which, as explained, joins the barrel 10 and head 11. A spring 84 extends between the end of rack 41 and the housing wall surrounding the reduced bore portion 83, this spring surrounding the rack extension 82 and serving to move rack 41 to the left and drive the centralizing plungers outwardly.

As seen in FIGURE 1, a trigger 85 is fixed to the lower surface of the rod 60 near its right hand end by any suitable means such for example as the screw 86. It will be noted that the trigger 85 is thus in a position so that it can be readily pulled by the index finger of the operator's hand when holding the instrument by the pistol grip 16. Operation of trigger 85, i.e., movement to the right as seen in FIGURE 1, will thus move the rod 60 to the right. The first movement of the rod to the right will compress the springs 84 and 68 and will cause movement of the indicator contact plunger 14 to the right. When the indicator contact plunger 14 has moved through its complete range of operation, further movement of the rod 60 to the right will cause compression of the spring 67 and cause the screw 64 and extension 62 to move to the right within and relative to the sleeve 63.

Also movement to the right of the rod 60 and arm 73 will cause the racks 37 and 41 to move to the right, the movement of the latter of course resulting in compression of the spring 84. As the racks 37 and 41 move to the right they will, through the respective pinions and racks, cause both the centralizing plungers and gaging plunger to move inwardly. Thus the plungers will be retracted and the gage can be entered into a bore.

It will be noted that since the effective length of flatted portion 40 of rack 37 is less than that of flatted portion 43 of rack 41, the rack 41 may move through a greater distance than rack 37. This provides for greater retracting movement of the centralizing plungers which is necessary since they are, in their fully extended position, in substantial alignment at the tips and must be appreciably out of alignment in order to enter a small bore.

Since the rod 60 must move through a sufficient distance to produce this full retraction movement of the centralizing plungers 18 and 20 and since the measuring plunger 21 is limited in its movement, means comprising the spring 77 are provided to make relative movement of rod 60 and rack 37 possible. Thus when rod 60 is moved to the right to the extent that the shoulder at the left end of flatted area 40 of rack 37 makes contact with screw 38 then continued movement of rod 60 to the right causes the spring 77 to be compressed between arm 73 and cap 76. Enlargement 80 of pin 78 may move out of contact with cap 76 in this condition of spring 77.

After entry of the gaging head into the bore, the trigger 85 is released and the various springs mentioned expand driving the centralizing plungers and the gaging plunger outwardly into contact with the bore walls. Specifically, spring 67 expands as does spring 84 and rod 60 starts to move toward the left.

After a very limited amount of movement of rod 60 spring 77 of rack 37 will have expanded and resumed the condition shown in FIGURE 3a and thereafter rack 37 will move with rod 60. Also spring 67 will continue its expansion until the point is reached at which the shoulder of screw 64 is in contact with the interior shoulder of sleeve 63. Once this point has been reached further movement of rod 60 to the left will permit the expansion of spring 68 (and of the dial indicator internal return spring) and cause the contact plunger 14 of the dial indicator to move to the left.

At some point in the movement, depending upon the diameter of the bore being gaged, the centralizing plungers 18 and 20 will move into contact with the wall of the bore being gaged which will prevent further expansion of spring 84. However, the rod 60 under urge of the spring 68 (and of the internal return spring of the dial indicator) will cause further leftward movement of the rod 60 and its enlargement 80 contacts the extension of rack 37 and moves it to the left as seen in FIGURES 3a and 3b. Such further movement is permitted as indicated above since the lower end of arm 73 may move to the left in the notch 81 of rack 41.

It will of course be understood that the particular indicator used is so chosen that the pieces being checked produce readings within the range of the indicator and preferably within a relatively narrow portion of that range to ensure the greatest accuracy.

It will also be obvious that the range of a particular bore gage is extended in the usual manner by utilizing various range extensions or fixed contacts such as 17.

In some instances it may be desirable to utilize a dial indicator having a range equivalent to the total movement of the gaging plunger and in this event the lost motion connection comprising sleeve 63 and screw 64 could be omitted.

Referring now to FIGURES 8 and 9, it will be seen that the device heretofore described is readily adapted to use as a concentricity gage. When so utilized the centralizing plungers are omitted together with their rack and gears for driving these centralizing plungers. Additionally, the arm 73 is connected directly into a slot in the rack 37 and the spring and cap 77 and 76 are omitted, the rack end bearing directly against the enlargement 80 of pin 78.

In addition to the omission and modifications mentioned above a screw 87 having a long shank is substituted for the screw 47 and serves as a limit or range adjustment screw to adjustably limit the travel of the rack 37 to the left and consequently the outward movement of the gaging plunger 21. Also a sleeve or plug 88 is mounted on the left hand end 54 of the cylindrical extension 54 of barrel 10, the plug having an outer diameter substantially equal to the bore diameter of the bore through which the head 11 is to pass in order that the measuring plunger may cooperate with the walls of a bore beyond the entry bore.

The plug 88 is usually provided with a flange 90 which determines the depth into which the plug may be inserted into the entry bore. Plugs, such as 88, are of course dimensioned in accordance with the particular work which is to be checked. Although not shown in the drawings it will be obvious that the plug or sleeve 88 may be of well known spring expanding type.

As is obvious more particularly from FIGURE 9, the gage is entered through the entry bore shown in dot-dash lines and designated 91 and during such entry the measuring plunger is retracted. After the flange 90 seats against the end of the work piece the trigger is released and the measuring plunger 21 moves into the position shown in FIGURE 9 giving an indication on the dial indicator of the diameter of the inner bore designated 92 in FIGURE 9. This reading of actual diameter is, however, unimportant in the particular application under discussion. Concentricity can be determined by rotating the entire bore gage within the bore 91 or within the sleeve 88 thus causing the indicator to show variations from point to point if the bore 92 is eccentric to the bore 91.

The concentricity of an inner bore of lesser diameter than the outer or reference bore may of course also be determined. In this case the procedure is the same as described above with reference to FIGURE 9; also in this case it may be desirable to utilize screw 87 to predetermine the maximum outward movement of the gaging plunger 21, the movement being limited to a point just beyond the point of contact with the bore to be gaged.

It will be seen that when arranged for use as a concentricity gage as described above, the gage of our invention retains the advantage of permitting a very large retraction thus making a single gage usable for a wide range of bore diameters and permitting entry through a small bore to check the concentricity of a relatively large bore. These advantages result, as has been indicated, in large measure from the utilization of racks and gears which permit much greater retraction movement than is possible with the common arrangement of levers or cone ended measuring plungers cooperating with a cone ended motion transmitting rod.

Although throughout the foregoing the instrument has been described as utilizing a common form of dial indicator it will be understood that many variations of indicator means are possible, for example, an air gage system might be actuated by the motion transmitting rods or the moving element of a capacitor type or other electrical gage might be so operated.

Also the motion transmitting rod need not be mounted on the barrel axis but might obviously be offset therefrom and in fact the barrel need not be circular in cross section but might be of any desired shape.

Therefore, while we have described preferred embodiments of the invention, it will be understood that we wish to be limited not by the foregoing description, but solely by the claims granted to us.

What is claimed is:

1. In a dial bore gage, in combination, a gaging plunger, an indicator means, means for transmitting motion from said gaging plunger to said indicator comprising, rack teeth on said plunger, a gear meshing with said teeth, a rack meshing with said gear, a rod for transmitting movement of said rack to said indicator means, means for operating said rod in a retracting direction, spring means urging said rod in the opposite direction; and adjustable means for limiting the movement of said rack in said opposite direction to thereby limit the outward movement of said gaging plunger.

2. In a dial bore gage, in combination, a gaging plunger, centralizing plungers, an indicator means, means for transmitting movement from said gaging plunger to said indicator means comprising rack teeth on said gaging plunger, a gear meshing with said teeth, a rack meshing with said gear and a rod for transmitting movement of said rack to said indicator means, rack teeth on said centralizing plungers, a gear meshing with the teeth of said plungers, a centralizing rack meshing with said gear, means on said rod for operating said centralizing rack in a retracting direction, and spring means for operating said centralizing rack in the opposite direction, said operating means engaging said centralizing rack through a lost motion connection to permit movement of said rod after said centralizer plungers are restrained by the barrel of a bore during gaging.

3. A dial bore gage of the type having centralizing and measuring plungers retractable through a relatively great distance to permit entry of the gaging head through a small entry bore into a large bore to be gaged, comprising, in combination, a barrel, a dial indicator mounted on said barrel with its contact plunger in axial alignment therewith, a gaging head mounted on the opposite end of said barrel, a measuring plunger mounted in said head for reciprocation along a diameter of a bore to be measured, a fixed gaging contact mounted on said head in axial alignment with said measuring plunger and on the same diameter of a bore to be measured, a pair of centralizing plungers mounted for reciprocation in said head, one of said plungers being mounted at either side of said movable measuring plunger, said centralizing plunger, measuring plungers and fixed gaging contact lying in a common plane perpendicular to the axis of said gaging head and said barrel, rack teeth on said measuring and centralizing plungers, a gear meshing with the teeth of each of said centralizing plungers, said gears being rotatable together, a centralizing rack having teeth in mesh with one of said centralizing gears, said centralizing rack extending parallel to the axis of said barrel and said gaging head, a measuring rack meshing with the teeth of said measuring plunger gear, said measuring rack also extending parallel to the axis of said barrel, a motion transmitting rod extending through said barrel, means to engage and drive said measuring and centralizing racks for gaging movement, and means for moving said rod to retract said measuring and centralizing plungers.

4. A dial bore gage as claimed in claim 3, wherein said centralizing plunger gear meshes with rack teeth formed on the forward surface of said centralizing plungers and said measuring plunger gear meshes with rack teeth formed on the rearward surface of said measuring plunger whereby the axial dimension of said gaging head is materially reduced.

5. A dial bore gage as claimed in claim 3, wherein said measuring and centralizing racks have their teeth formed on the opposite sides thereof, said centralizing gear lying beneath its rack and said measuring gear lying above its rack whereby the diametrical dimension of said gaging head is materially reduced.

6. A dial bore gage as claimed in claim 3, wherein said centralizing plunger teeth are in engagement with individual gears fixed to a common shaft, said shaft being of materially less diameter than said gears and said measuring plunger lying between said pair of centralizing plunger gears and wherein said measuring plunger gear is mounted on a shaft of lesser diameter than said gear, said centralizing plungers lying closely adjacent said shaft, one on either side of said gear.

7. A dial bore gage as claimed in claim 3, wherein means are provided for preventing rotation of said measuring and centralizing racks in respective bores.

8. A dial bore gage as claimed in claim 3, wherein said measuring and centralizing racks are provided with flatted portions, said portions being engaged by the flat end of a screw threaded into said gaging head, said screws thus limiting the movement of the respective rack, said centralizing rack being provided with a flatted area of greater extent than said measuring rack to permit a greater travel of the centralizing plungers than of the measuring plungers.

9. A dial bore gage as claimed in claim 3, wherein said means on said rod engages said centralizing and measuring racks and said means engaging said centralizing rack comprises an arm extending outwardly from said motion transmitting rod into a slot formed in said centralizing rack whereby said measuring plunger can move outwardly into engagement with a bore subsequent to engagement of said centralizing plungers with that bore.

10. A dial bore gage as claimed in claim 9, wherein said centralizing rack is provided with an extension having a reduced diameter and a spring surrounds said extension with one end abutting the shoulder between said rack and the reduced extension thereof and the other end abutting a wall in said barrel, said spring serving to move said centralizing plungers toward their outermost position, said spring pressure being ineffective to urge said measuring plunger outwardly against a bore wall due to the freedom of said engaging means to move in said rack slot.

11. A dial bore gage as claimed in claim 3, wherein said motion transmitting rod is provided with a pin extending outwardly therefrom and spaced from the end thereof adjacent said drive means, and wherein said measuring rack is provided with an extension normally held against said pin by means of a compression spring between said drive means and the end of said extension, said drive means for said measuring rack forming a seat for said spring at one end, said drive means having a clearance aperture through which said rack extension passes whereby said rod may be operated after said rack reaches the limit of motion in the retracting direction, said pin then moving away from the end of said rack extension and said spring being compressed.

12. A dial bore gage as claimed in claim 3, wherein a lost motion device is imposed between the end of said motion transmitting rod and the indicator contact plunger to thereby permit greater movement of said rod than of the indicator contact plunger.

13. A dial bore gage as claimed in claim 12, wherein said lost motion device comprises a reduced extension of said motion transmitting rod, a sleeve having a portion slidable on said extension, a flange mounted at the end of said extension and engaging a shoulder on the interior of said sleeve and a spring extending between the end of said rod and the end of said sleeve, said spring normally maintaining said flange in engagement with said shoulder and permitting relative movement therebetween when said motion transmitting rod is moved through a greater distance than the total possible movement of the indicator contact plunger.

14. A dial bore gage in accordance with claim 3, wherein said measuring and centralizing gears are fixed for rotation on respective shafts and wherein said shafts are supported in bearings threaded into said gaging head and locked in position by set screws engaging the threaded portions of said bearings.

15. A dial bore gage in accordance with claim 3, wherein said barrel has a slot extending therethrough and said motion transmitting rod has a trigger member mounted thereon and extending through said slot, said barrel further having a handle mounted thereon adjacent said slot, said handle being positioned to extend radially outward in the same direction as said trigger member whereby the trigger member may be readily operated by a hand engaging said handle.

16. In a dial bore gage of the type having a measuring plunger and a means for retracting said measuring plunger to permit entry of the gage through a reference bore into another bore, in combination, a barrel, a dial indicator mounted on said barrel with its contact plunger extending into said barrel, a motion transmitting rod extending through said barrel, a gaging head mounted on said barrel at the end remote from said dial indicator, a rack mounted in said head for reciprocatory movement parallel to the axis of said barrel, said rack being connected to said motion transmitting rod for motion therewith, a gear meshing with said rack, said gear being mounted on a shaft extending transversely of said gaging head, rack teeth on the measuring plunger, said gear engaging said rack teeth, said plunger lying in a plane perpendicular to the axis of said barrel and head and being on a diameter of a bore to be gaged, means mounted on said barrel for centering said barrel in the reference bore, and a trigger member fixed to said motion transmitting rod whereby said measuring plunger may be retracted and said gaging head entered through the reference bore into the other bore to be gaged for concentricity, said barrel and head being held by said centering means in position concentric with the bore whereby said measuring plunger will, on release of said trigger, engage the wall of the other bore and subsequent rotation of said gage on its axis will serve to indicate on a dial indicator variations of radius of the bore and thereby the eccentricity of the other bore with respect to the reference bore.

17. A dial bore gage as claimed in claim 16, wherein said motion transmitting rod is provided with a lost motion connection between said rack and said indicator contact plunger whereby said measuring plunger may be retracted through a distance greater than the total range of the dial indicator.

18. A dial bore gage as claimed in claim 16, wherein a limit screw is threaded into said gaging head in alignment with said rack, said screw serving to adjustably limit the outward radial movement of said measuring plunger.

19. In a dial bore gage, in combination, a gaging plunger, centralizing plungers, and indicator means, means for transmitting movement from said gaging plunger to said indicator means comprising rack teeth on said gaging plunger, a gear meshing with said teeth, a gaging rack meshing with said gear, and a rod for transmitting movement of said rack to said indicator means; rack teeth on said centralizing plungers, a gear meshing with the teeth of said plungers, a centralizing rack meshing with said gear, and means on said rod for operating said centralizing rack and said gaging rack in a retracting direction.

References Cited by the Examiner

UNITED STATES PATENTS

| | | | |
|---|---|---|---|
| 1,899,920 | 2/1933 | Litterio | 33—178 |
| 2,565,844 | 8/1951 | Eisele | 33—178 |

FOREIGN PATENTS

| | | |
|---|---|---|
| 646,248 | 11/1950 | Great Britain. |
| 889,696 | 9/1953 | Germany. |

LEONARD FORMAN, *Primary Examiner.*

SAMUEL S. MATTHEWS, *Assistant Examiner.*